United States Patent [19]

Richardson

[11] Patent Number: 5,054,159
[45] Date of Patent: Oct. 8, 1991

[54] DEBRIS REMOVAL APPARATUS FOR POWER BLOWERS

[76] Inventor: Paul D. Richardson, 870 Cherokee St., Vidor, Tex. 77662

[21] Appl. No.: 411,831

[22] Filed: Sep. 25, 1989

[51] Int. Cl.$^5$ .......................... A47L 5/00; A47L 5/10
[52] U.S. Cl. ..................................... 15/400; 15/393; 15/398; 15/401
[58] Field of Search ................ 15/405, 400, 401, 402, 15/393, 46, 159 R, 160, 162, 168, 171, 173, 256.5, 111, 106, 114, 117, 398

[56] References Cited

U.S. PATENT DOCUMENTS

| | | | |
|---|---|---|---|
| 2,080,334 | 5/1937 | Petrovsky | 15/114 |
| 4,091,579 | 5/1978 | Giangiulio | 15/111 |
| 4,407,213 | 10/1983 | Evans | 15/114 |
| 4,831,678 | 5/1989 | Dietsche | 15/160 |
| 4,884,314 | 12/1989 | Miner et al. | 15/405 |

Primary Examiner—Henry J. Recla
Assistant Examiner—David J. Walczak
Attorney, Agent, or Firm—Kenneth A. Roddy

[57] ABSTRACT

A hollow tubular nozzle for attachment to power blowers or "leaf blowers" has a depending rectangular mounting flange extending transversely across its underside, the bottom portion of which is adapted to removably receive and retain a debris and trash loosening attachment member in the form of a brush or scraper blade which forcefully engages the surface to be cleaned to dislodge debris and trash therefrom while preventing damage to the nozzle from contacting the surface. The mounting flange may be integrally formed on the nozzle, or it may be a separate piece having a top portion conforming to the configuration of existing rectangular or round nozzles and adapted to be secured thereto. The mounting flange, brush and scraper attachments may be sold as a do-it-yourself kit to be installed on the existing nozzles. The user may simply install and remove the brush or scraper blade onto the mounting flange when desired. Another embodiment of the brush and scraper attachments have a top portion adapted to be received and retained on the nozzle by means of spring clip members.

4 Claims, 4 Drawing Sheets

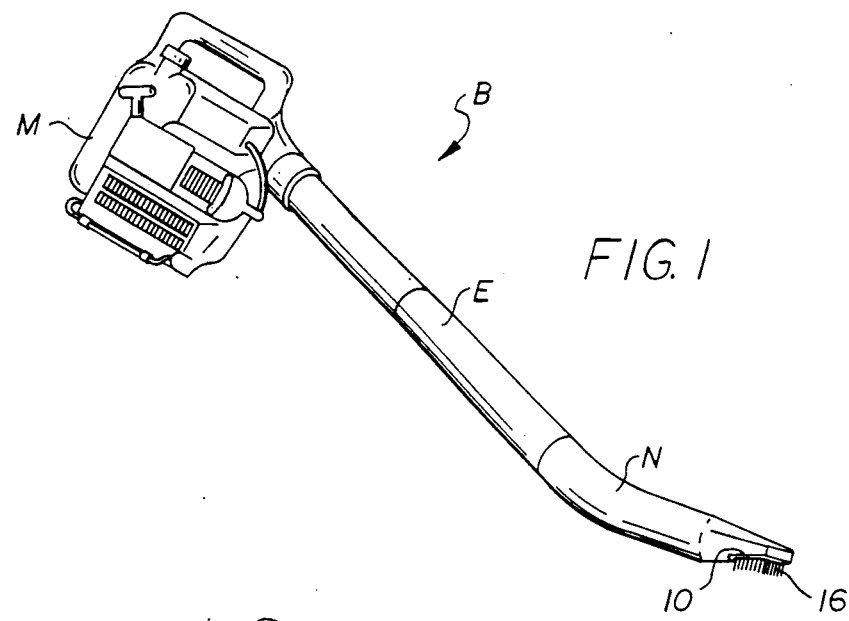
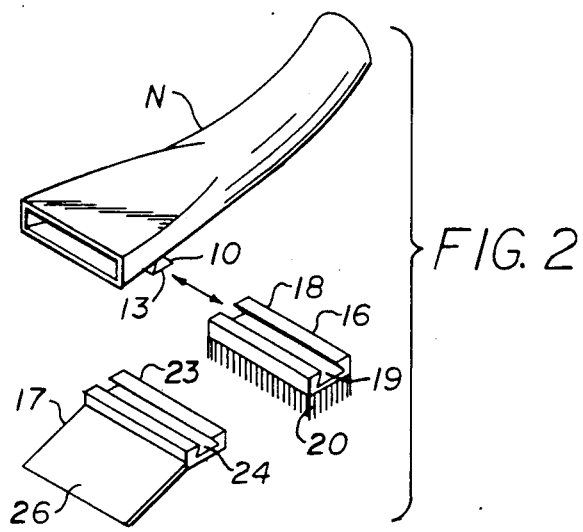
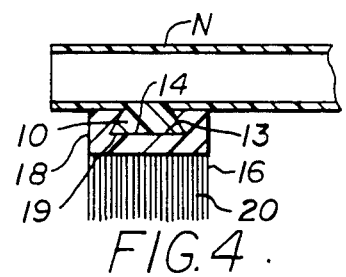
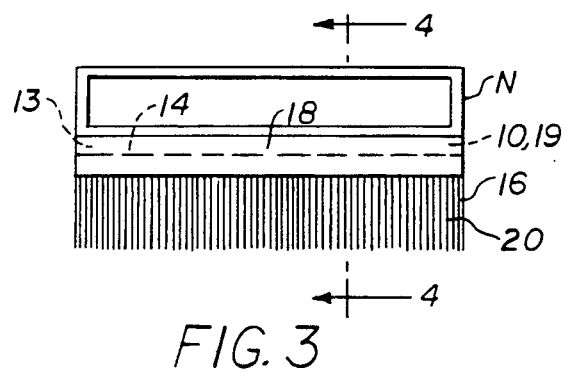
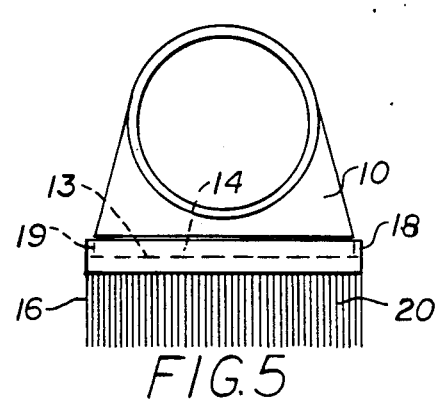

DEBRIS REMOVAL APPARATUS FOR POWER BLOWERS

BACKGROUND OF THE INVENTION

1. Field of the Invention

This invention relates generally to brush and scraper devices, and more particularly to debris removing apparatus for attachment to power blowers.

2. Brief Description of the Prior Art

Power blowers or "leaf blowers" are small portable clean-up machines having a small electric or gasoline motor connected to an elongate tubular extension which is held in the hand of operator to direct a forceful stream of air onto the surface to be cleaned. In some models, the motor is carried on the back of the operator and in other models the motor is provided with a strap such that the blower is easily carried during the cleaning operations. The tubular extension has a sleeved nozzle which is slidably received on the end. The nozzle is formed of lightweight plastic material and terminates in either a round or rectangular shape depending upon the manufacturer. These lightweight easily maneuverable blowers substantially reduce the time and labor required for many cleanup tasks and are used primarily for cleaning grass clippings from walks and driveways after cutting the lawn. They are also widely used in some areas of the country in removing snow.

Often the debris and trash is difficult to blow away and must be loosened first. For example, wet leaves and grass clippings, bird and animal droppings, large clumps of soil and grass, etc. Edgers throw soil onto concrete surfaces and the edger wheels pack the soil onto the surface. Soil, grass clippings, and debris will also accumulate on oil spots on driveways and parking lots.

To remove the accumulated debris, the operator must bend over numerous times and scrape or loosen the debris by hand, or sometimes to avoid bending, will use his or her shoe to the loosen the material.

The operator often will use the end of the tubular extension like a rake to loosen or scrape away the difficult debris and trash. Since the end of the tubular extension is plastic, it quickly becomes damaged and worn away by the scraping and loosening operations performed on concrete and other rough surface.

Although there is a long felt need, the power blower industry has failed to provide apparatus which could be easily and quickly installed on the end of the tubular extension to loosen or scrape away debris, trash, and snow, and prevent damage to the end of the extension.

There are several patents which disclose various blower and brush combinations, none of which are suitable for use on commercially available power blowers.

La Pour, U.S. Pat. No. 3,999,243 discloses a battery powered leaf and debris blower for golf greens. The blower has a cylindrical housing containing a motor and fan and a tubular shaft extending from the housing with a putter-shaped head at the end of the shaft. Air is directed through the shaft and outward through a slit in the head. A brush is pivotally attached to the head.

Brown, U.S. Pat. No. 2,623,234 discloses a suction or fluid powered apparatus for cleaning gutters and downspouts having an elongate conduit with a reverse curve or hook-shaped end which is engaged over the side of a gutter and has a pair of handles and reversing valve at the other end. A pair of ports connect the reversing valve to a vacuum cleaner and the valve is movable to effect suction or blowing through the conduit. A ring-like brush member is secured by wing screws to the bent end of the conduit.

The present invention is distinguished over the prior art in general, and these patents in particular by a hollow tubular nozzle for attachment to power blowers or "leaf blowers" which has a depending rectangular mounting flange extending transversely across its underside, the bottom portion of which is adapted to removably receive and retain a debris and trash loosening attachment member in the form of a brush or scraper blade which forcefully engages the surface to be cleaned to dislodge debris and trash therefrom while preventing damage to the nozzle from contacting the surface. The mounting flange may be integrally formed on the nozzle, or it may be a separate piece having a top portion conforming to the configuration of existing rectangular or round nozzles and adapted to be secured thereto. The mounting flange, brush and scraper attachments may be sold as a do-it-yourself kit to be installed on the existing nozzles. The user may simply install and remove the brush or scraper blade onto the mounting flange when desired. Another embodiment of the brush and scraper attachments have a top portion adapted to be received and retained on the nozzle by means of spring clip members.

SUMMARY OF THE INVENTION

It is therefore an object of the present invention to provide a power blower having a removable device on the end of the nozzle portion for loosening debris and trash from surfaces being cleaned and to prevent the nozzle end from becoming worn or damaged.

It is another object of this invention to provide a nozzle for attachment to power blowers which has a removable debris and trash loosening device on the end.

Another object of this invention is to provide a system of apparatus which may be installed on existing power blower nozzles and has debris and trash loosening attachments which may be easily and quickly installed and removed as desired.

Another object of this invention is to provide a do-it-youself kit having a mounting flange adapted to be secured on existing power blower nozzles, and a brush attachment and scraper attachment to be removably installed on the mounting flange.

Another object of this invention is to provide a brush attachment and a scraper attachment which are easily and quickly removably installed on the nozzle of existing power blowers.

A further object of this invention is to provide a system of accessory apparatus which will greatly increase the utility of existing power blowers and will expand the product line of existing power blower manufacturers with little expense or expensive retooling.

A still further object of this invention is to provide removable debris and trash loosening devices for the nozzle of power blowers which are simple in construction, economical to manufacture, and are rugged and durable in use.

Other objects of the invention will become apparent from time to time throughout the specification and claims as hereinafter related.

The above noted objects and other objects of the invention are accomplished by a hollow tubular nozzle for attachment to power blowers or "leaf blowers" which has a depending rectangular mounting flange extending transversely across its underside, the bottom portion of which is adapted to removably receive and retain a debris and trash loosening attachment member in the form of a brush or scraper blade which forcefully engages the surface to be cleaned to dislodge debris and trash therefrom while preventing damage to the nozzle from contacting the surface. The mounting flange may be integrally formed on the nozzle, or it may be a separate piece having a top portion conforming to the configuration of existing rectangular or round nozzles and adapted to be secured thereto. The mounting flange, brush and scraper attachments may be sold as a do-it-yourself kit to be installed on the existing nozzles. The user may simply install and remove the brush or scraper blade onto the mounting flange when desired. Another embodiment of the brush and scraper attachments have a top portion adapted to be received and retained on the nozzle by means of spring clip members.

BRIEF DESCRIPTION OF THE DRAWINGS

FIG. 1 is an isometric view of a power blower having a brush attachment on the rectangular nozzle end of the tubular extension.

FIG. 2 is an exploded isometric view of a power blower rectangular nozzle end adapted to receive a debris removal brush or scraper attachment in accordance with the present invention.

FIG. 3 is a front end view of a power blower rectangular nozzle having an integral mounting flange and a brush attachment on the mounting flange.

FIG. 4 is a cross sectional view of the power blower rectangular nozzle having an integral mounting flange and a brush attachment taken along line 4—4 of FIG. 3.

FIG. 5 is a front end view of a power blower round nozzle having a brush attachment in accordance with the present invention.

DESCRIPTION OF THE PREFERRED EMBODIMENT

Figure 6:
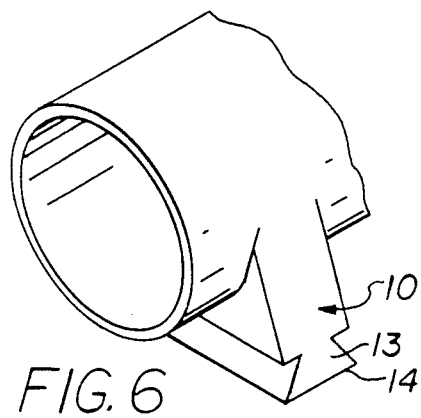
FIG. 6 is an isometric view of a power blower round nozzle having an integral mounting flange for receiving a debris removal attachment in accordance with the present invention.

Referring to the drawings by numerals of reference, there is shown in FIG. 1, a hand-held power blower, or "leaf blower" B having a motor M connected to an elongate tubular extension E. One end of a tubular nozzle N is slidably received on the tubular extension E and its other end terminates in either a rectangular or round configuration. The nozzle N is formed of lightweight plastic material.

It should be understood, that in various models of power blowers, the motor M may be carried on the back of the operator or provided with a strap such that the blower is easily carried during the cleaning operations.

Referring additionally to FIG. 2, 3, and 4, there is shown a preferred nozzle N in accordance with the present invention. The nozzle N is provided with a depending mounting flange 10 extending transversely across its underside a short distance from the end opening of the nozzle. As shown in FIG. 4, the mounting flange 10 may be formed integrally with the nozzle N during its manufacture.

Figure 7:
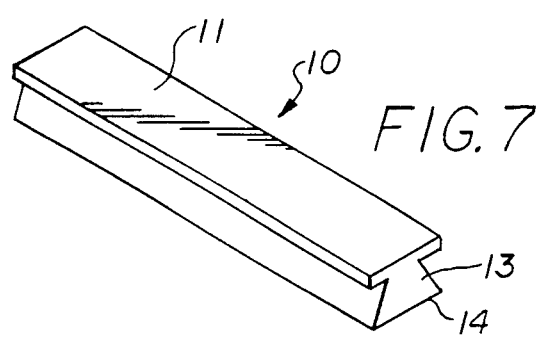
FIG. 7 is an isometric view of a separate mounting flange to be secured to a rectangular power blower nozzle for receiving a debris removal attachment.
Figure 8:
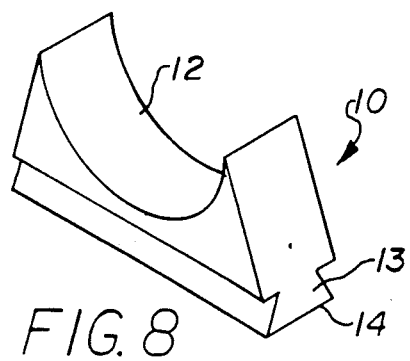
FIG. 8 is an isometric view of a separate mounting flange to be secured to a round power blower nozzle for receiving a debris removal attachment.
Figure 9:
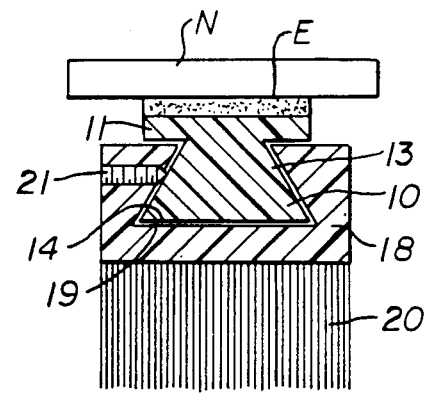
FIG. 9 is a transverse cross sectional view of a mounting flange with a debris removal brush attached utilizing a dove tail groove and optional set screw retaining means.

As shown in FIGS. 7 and 8, the mounting flange 10 may also be provided as a separate piece in kit form and secured to existing nozzles by conventional means such as adhesives, epoxy, double edge tape, or screws. In FIG. 7, the mounting flange 10 has a flat top surface 11 for securing it to a rectangular nozzle, and in FIG. 8, the top surface 12 of the mounting flange 10 is inwardly curved corresponding to the shape of a round nozzle. FIG. 9, shows a mounting flange 10 secured by adhesive or epoxy E to the bottom surface of the nozzle N.

The mounting flange 10 has a lower portion 13 which is adapted to receive and retain one or more debris and trash loosening devices. One preferred mounting flange 10 is shown in FIGS. 2–9 and 13. In transverse cross section, the mounting flange 10 extends angularly outward from the top surface of the nozzle surface (integrally formed) or from the flat 11 or curved 12 top surface (separate piece) and terminates in a wider flat bottom surface to define a wedge or "dove-tail" configuration 14. Alternatively, as shown in FIGS. 10 and 14, the bottom portion of the mounting flange 10 may be formed in a inverted T-shape cross section 15.

The mounting flange 10 provides a mounting surface which removably receives one or more debris and trash loosening attachments. The debris and trash loosening attachments are preferably in the form of a brush 16 or a scraper blade 17 device.

The brush attachment 16 has a rectangular top portion 18 with a wedge-shaped or "dove-tail" groove 19 in the top surface extending longitudinally the length of the top portion. Stiff bristles 20 extend from the bottom of the top portion 18. The "dove-tail groove" 19 is axially aligned with the wedge-shaped "dove tail" of the mounting flange 10 and removably slides thereon. The relative dimensions of the dove-tail projection 14 and dove-tail groove 19 are such that they will be frictionally engaged to prevent accidental lateral removal but can be manually removed with a little pressure when desired. A set screw 21 may also be installed through the edge of the top portion 18 to engage the lower portion 13 of the mounting flange 10 to further secure brush 16. During brushing or scraping operations, the forces acting on the brush 16 are generally in alignment with the longitudinal axis of the tubular nozzle N and the dove-tail interconnection of the mounting flange 10 and groove 19 provides a secure mounting for the brush.

Figure 10:
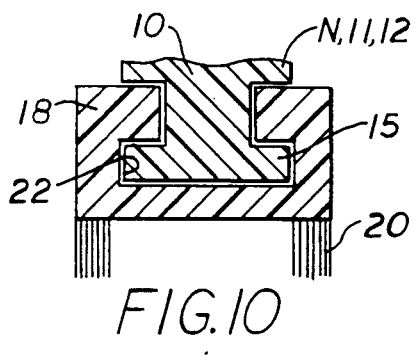
FIG. 10 is a transverse cross sectional view of a mounting flange with a debris removal brush attached utilizing an inverted T-shaped flange and groove.

Alternatively, as shown in FIG. 10, the upper portion 18 of the brush 16 may be provided with a longitudinal inverted T-shaped slot 22.

Figure 12:
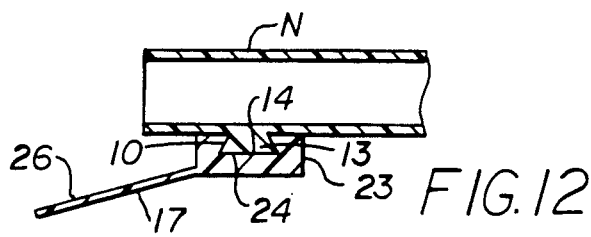
FIG. 12 is a cross sectional view of a power blower nozzle having an integral mounting flange and a scraper attachment.
Figure 13:
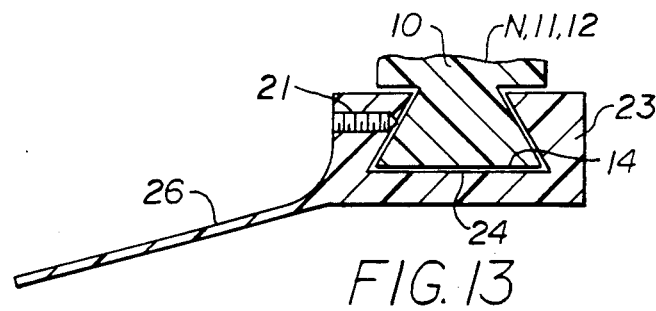
FIG. 13 is a transverse cross sectional view of a mounting flange with a debris removal scraper attached utilizing a dove tail groove and optional set screw retaining means.
Figure 14:
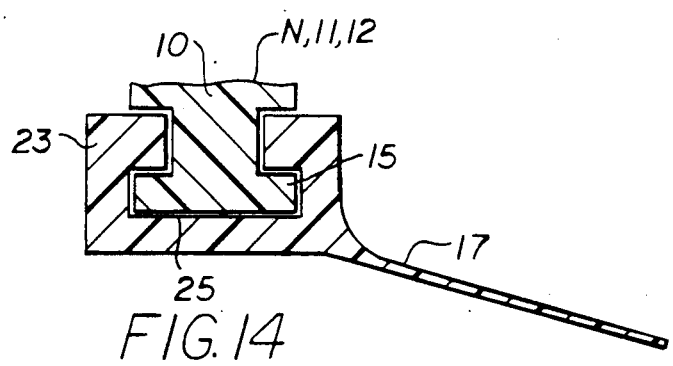
FIG. 14 is a transverse cross sectional view of a mounting flange with a debris removal scraper attached utilizing an inverted T-shaped flange and groove.

As shown in FIGS. 2, 12 and 13, the scraper blade attachment 17 has a rectangular upper portion 23 with a wedge-shaped or "dove-tail groove" 24 in its top surface extending longitudinally the length of the rectangular portion, or as seen in FIG. 14, an inverted T-shaped groove 25. A thin rectangular rigid blade portion 26 extends angularly forward and downward from the rectangular portion 23. As described above, the groove 24 or 25 of the upper portion 23 is axially aligned with the dove tail 14 or T-shaped portion 15 of the mounting flange 10 and removably slides thereon. The relative dimensions of the dove-tail or T-shaped connections are such that they will be frictionally engaged to prevent accidental lateral removal but can be manually removed when desired. A set screw 21 may also be installed through the edge of the upper portion 23 to engage the lower portion 14 of the mounting flange 10 to further secure the scraper 17.

It should be understood that the above described "dove tail" and "T-shaped" flange and groove embodiments are examples of suitable attachment connections, and that various other configurations may be utilized for removable connecting the attachments to the mounting flange without departing from the scope of the present invention.

Figure 11:
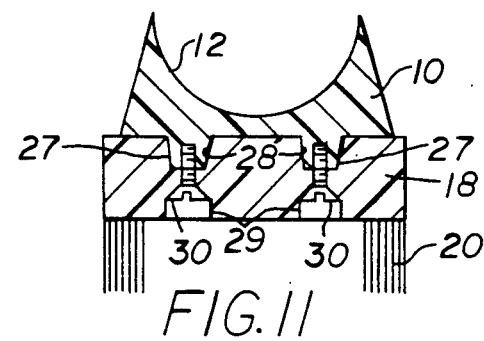
FIG. 11 is a longitudinal cross sectional view of a mounting flange for mounting on a round nozzle which utilizes screws for securing the debris removal attachment.
Figure 15:
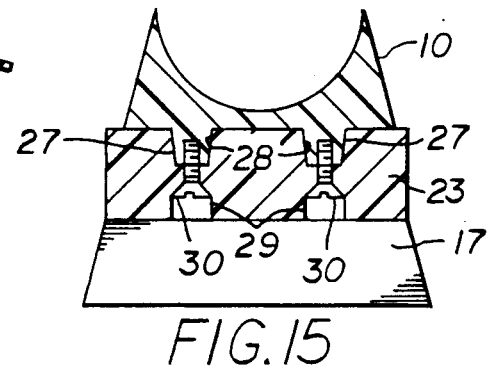
FIG. 15 is a longitudinal cross sectional view of a mounting flange for mounting on a round nozzle which utilizes screws for securing the debris removal scraper attachment.

For example, as shown in FIGS. 11 and 15, the bottom portion of the mounting flange 10 is provided with a pair of internally threaded, laterally spaced depending projections or bosses 27. The top portion 18 of the brush attachment 16 (FIG. 11) or the scraper blade 17 (FIG. 15) is provided with a pair of laterally spaced holes 28 in the top surface and another pair of counterbored holes 29 in the bottom surface axially aligned with the bosses 27. Screws 30 are inserted in the counterbored holes 29 and threadedly received in the bosses 27.

Figure 16:
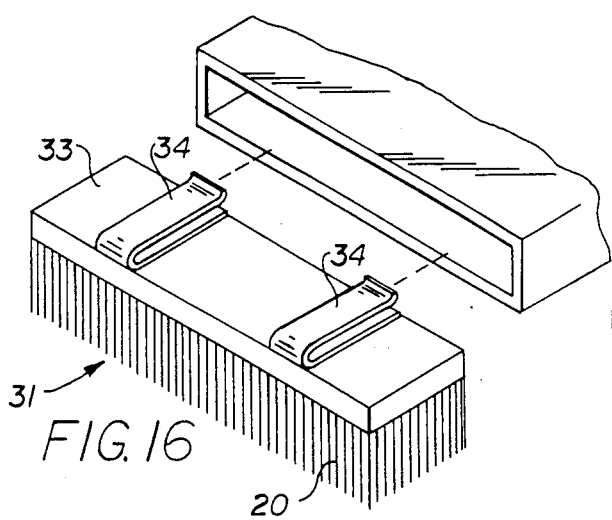
FIG. 16 is an isometric view of a clip-on debris removal brush attachment to be secured to a rectangular power blower nozzle.
Figure 17:
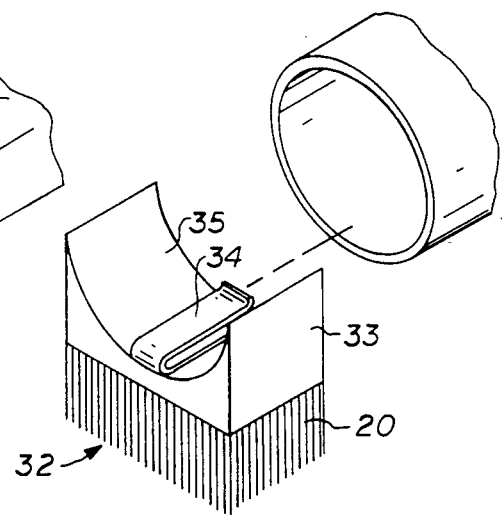
FIG. 17 is an isometric view of a clip-on debris removal brush attachment to be secured to a round power blower nozzle.

Clip-on brush attachments 31 and 32 are shown in FIGS. 16 and 17 respectively. In the embodiment for a rectangular nozzle end (FIG. 16), the top portion 33 of the brush 31 is provided with a pair of laterally spaced U-shaped spring clips 34 of resilient material such as spring steel or plastic. The spring clips 34 may be secured to the top surface of the upper portion 33 by conventional means or if the top of the brush is made of plastic, the clips may be integrally formed thereon during the molding operation or attached by sonic welding, adhesive, etc. In the clip-on brush attachment 32 for rounded end nozzles shown in FIG. 17, the upper portion 33 is inwardly curved 35 to fit the rounded nozzle and a single U-shaped spring clip 34 is provided at the lower portion of the curved surface. The user pushes the brush 31 or 32 onto the end of the nozzle to frictionally engage the clips 34 on the bottom surface of the nozzle.

Figure 18:
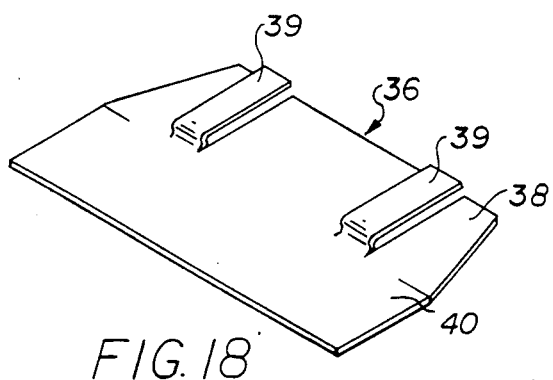
FIG. 18 is an isometric view of a clip-on debris removal scraper attachment to be secured to a rectangular power blower nozzle.
Figure 19:
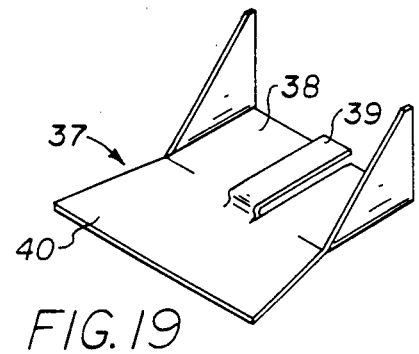
FIG. 19 is an isometric view of a clip-on debris removal scraper attachment to be secured to a round power blower nozzle.

Clip-on scraper blade attachments 36 and 37 are shown in FIGS. 18 and 19 respectively. The scraper attachments 36 and 37 have a generally rectangular upper or rearward portion 38 adapted to be received and retained on the blower nozzle and a rigid blade portion 40 extending angularly downward and outward beyond the front end of the nozzle when attached thereto. In the embodiment for a rectangular nozzle end (FIG. 18), the top or rearward portion 38 of the scraper blade 36 is provided with a pair of laterally spaced U-shaped spring clips 39 of resilient material such as spring steel or plastic. If the scraper blades 36 or 37 are a single piece construction of metal or plastic, the clips 39 may be integrally formed thereon during the molding or stamping operation, or the clips may be secured to the top surface of the upper or rear portion of the scraper blades 36 or 37 by conventional means such as sonic welding, adhesive, etc.

In the clip-on scraper blade attachment 37 for rounded end nozzles shown in FIG. 19, the opposite side edges or the upper or rearward portion 38 is bent or curved upwardly to engage the sides of the round nozzle. As with the clip-on brushes, the user pushes the upper or rearward portion of the scraper attachment onto the end of the nozzle to frictionally engage the clips 39 on the bottom surface of the nozzle.

Figure 20:
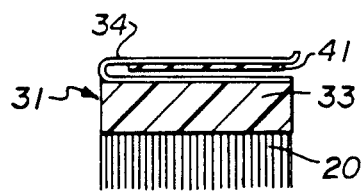
FIG. 20 is transverse cross section of a clip-on debris removal brush attachment having a gripping surface on the clip to facilitate securing it to a power blower nozzle.
Figure 21:
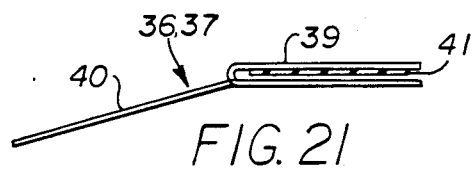
FIG. 21 is transverse cross section of a clip-on debris removal scraper attachment having a gripping surface on the clip to facilitate securing it to a power blower nozzle.

FIGS. 20 and 21 show a clip-on brush attachment 31 and a clip-on scraper attachment 36, 37 having a gripping surface on the interior surface of the spring clips 34, 39 to further facilitate securing it the nozzle and prevent accidental removal. The gripping surface 41 of the clips 34, 39 may be any suitable construction, such as a rubber strip (as shown), or a rough toothed or knurled surface.

It should be understood that the brush and scraper blade attachments described herein may also be of sufficient length to extend outward to each side of the nozzles a substantial distance to facilitate their use in removing snow from walks and driveways.

As described above, blower nozzles may be manufactured having the mounting flange integrally molded during manufacture wherein the brush and scraper attachments would be provided as accessories. The mounting flange may also be provided as a separate component for attachment, to the existing nozzles of various makes of power blowers, wherein the mounting flange, brush and scraper attachments may be sold as a do-it-yourself kit to be installed on the existing nozzles. In this case, the kit would be provided with a suitable adhesive or glue to attach the mounting flange permanently to the nozzle. The mounting flange would not interfere with the normal operation of the power blower and the brush and scraper blade may be installed and removed as desired.

While this invention has been described fully and completely with special emphasis upon a preferred embodiment, it should be understood that within the scope of the appended claims the invention may be practiced otherwise than as specifically described herein.

I claim:

1. A debris and trash loosening brush kit of components for attachment to the existing hollow tubular nozzle of power blowers of the type having a side wall and a longitudinal central opening extending from a forward end to a rearward end for conducting a stream of air therethrough, the kit comprising;
    a generally rectangular mounting flange component having a top portion conforming to the configuration of the nozzle side wall and adapted to be secured transversely across the underside of the nozzle forward end and having a longitudinally extending dovetail flange at the bottom thereof to removably receive and retain a brush component,
    fastener means for securing said mounting flange to an existing nozzle for power blowers, and
    a generally rectangular brush component having a top portion with a longitudinally extending dovetail groove formed therein to be slidably received on said mounting flange bottom dovetail flange and having a bottom portion comprising a plurality of depending stiff bristles configured to forcefully engage the surface to be cleaned to dislodge debris and trash therefrom while preventing the nozzle forward end from contacting the surface to be cleaned.

2. The kit of components according to claim 1 wherein
    said mounting flange component top portion is a flat surface conforming to the flat underside of an existing rectangular nozzle side wall.

3. The kit of components according to claim 1 wherein
    said mounting flange component top portion is an inwardly curved surface conforming to the curved underside of an existing round nozzle side wall.

4. A debris and trash loosening kit of components for attachment to the existing hollow tubular nozzle of power blowers of the type having a side wall and a longitudinal central opening extending from a forward end to a rearward end for conducting a stream of air therethrough, the kit comprising;
    a generally rectangular mounting flange component having a top portion conforming to the configuration of the nozzle side wall and adapted to be secured transversely across the underside of the nozzle forward end and having a longitudinally extending dovetail flange at the bottom thereof to removably receive and retain a scraper component,
    fastener means for securing said mounting flange to an existing nozzle for power blowers, and
    a generally rectangular scraper component having a rear portion with a longitudinally extending dovetail groove formed therein to be slidably received and retained on said dovetail mounting flange and having a rigid blade portion extending outwardly beyond said tubular member forward end to forcefully engage the surface to be cleaned and dislodge debris and trash therefrom while preventing said nozzle forward end from contacting the surface to be cleaned.

* * * * *